(No Model.) 2 Sheets—Sheet 2.

J. H. CHOQUETTE.
PATTERN FOR DRAFTING GARMENTS.

No. 484,138. Patented Oct. 11, 1892.

Witnesses
E. R. Conner
Geo. Ryder

Inventor
Joseph H. Choquette
By Geo. F. Whitney
Attorney

UNITED STATES PATENT OFFICE.

JOSEPH H. CHOQUETTE, OF FALL RIVER, MASSACHUSETTS.

PATTERN FOR DRAFTING GARMENTS.

SPECIFICATION forming part of Letters Patent No. 484,138, dated October 11, 1892.

Application filed September 2, 1891. Serial No. 404,490. (No model.)

*To all whom it may concern:*

Be it known that I, JOSEPH H. CHOQUETTE, a citizen of the Dominion of Canada, residing at Fall River, in the county of Bristol and State of Massachusetts, have invented certain new and useful Improvements in Drafting-Forms for Garments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to instruments for laying out patterns for garments; and its object is to enable this operation to be accurately performed by any person.

The invention consists in certain novel features of construction hereinafter set forth, and particularly pointed out in the claims.

Figure 1:
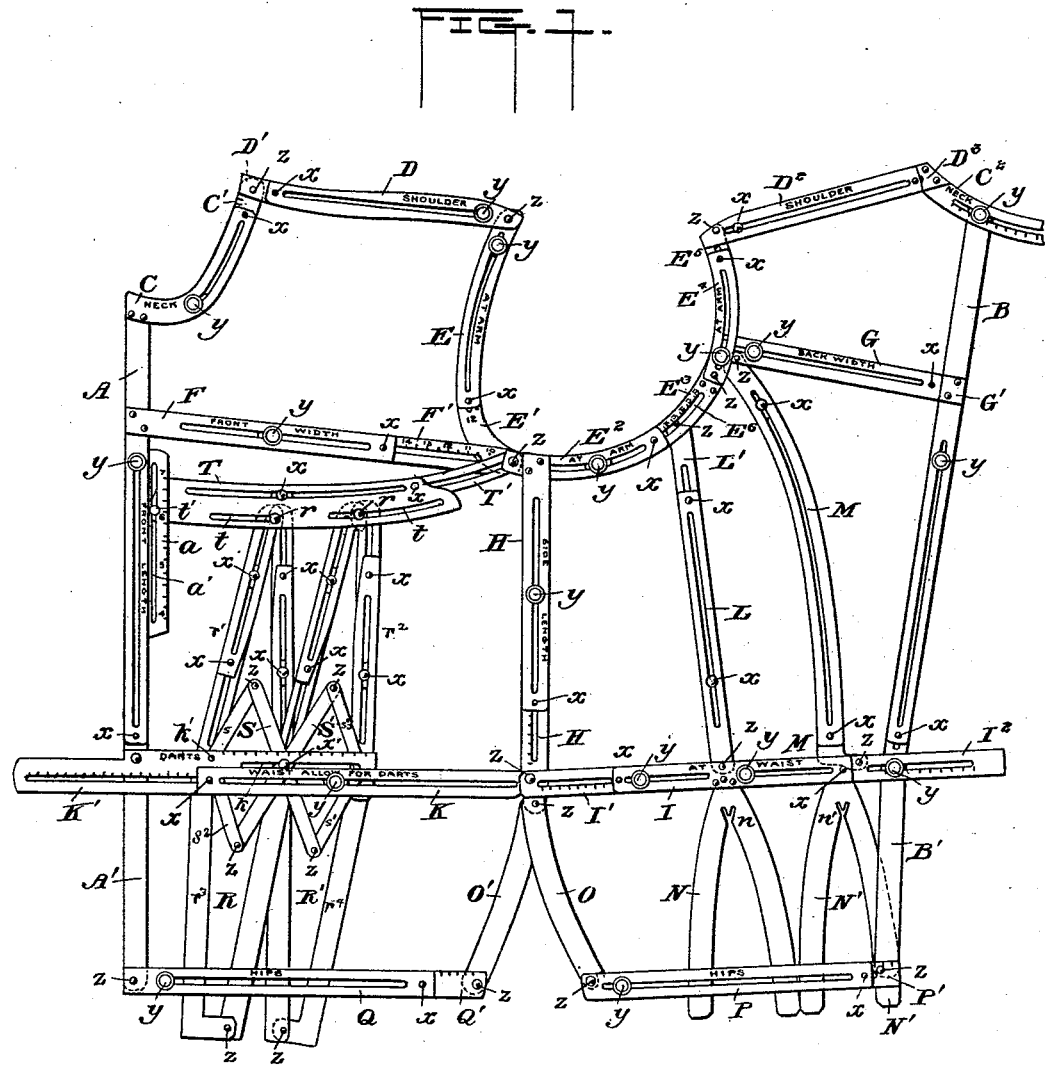
Figure 2:
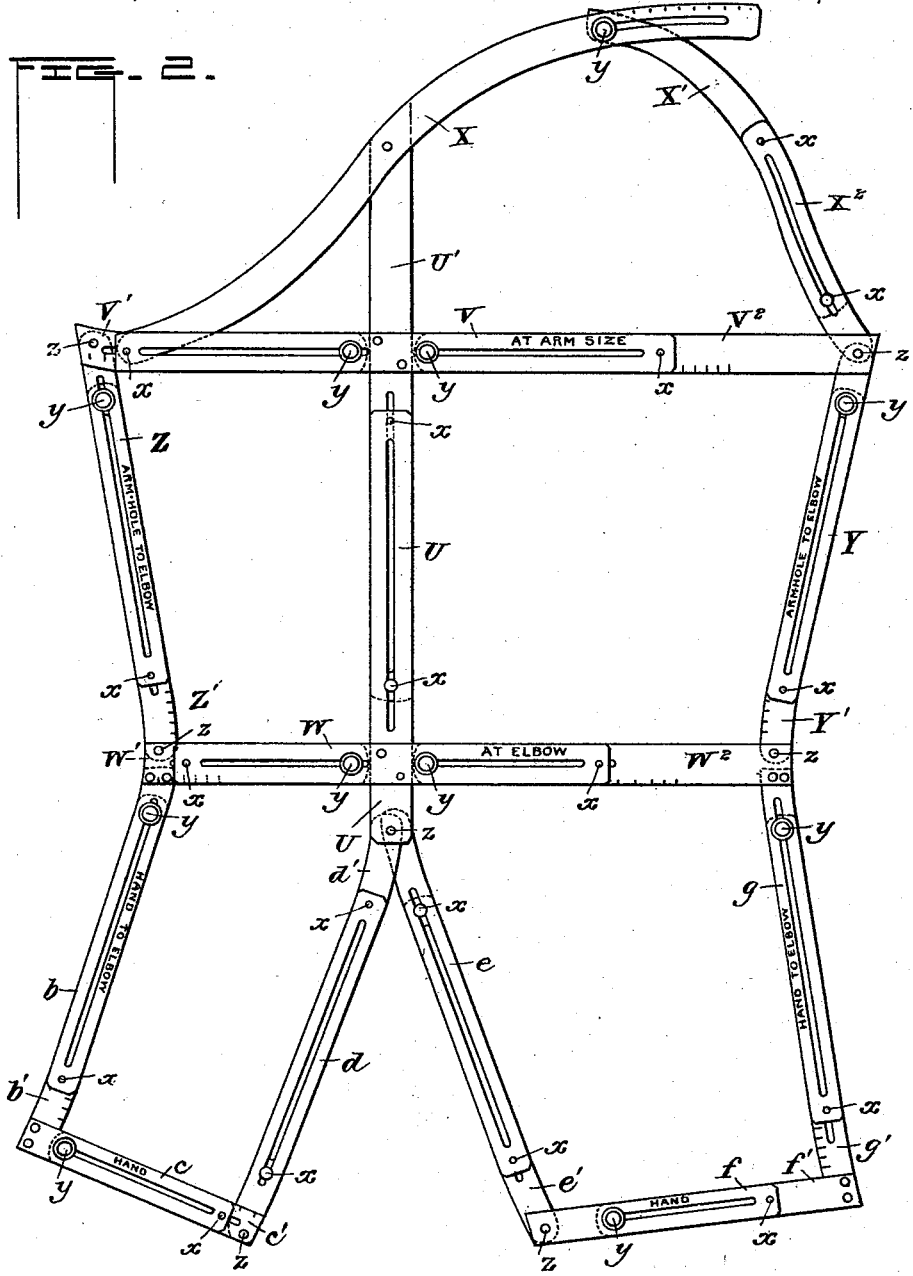
Figure 3:

In the drawings, Figure 1 illustrates an instrument for laying out the several pieces composing one side of a garment. Fig. 2 is a sleeve-drafting instrument, and Fig. 3 is a detail cross-section. Fig. 4 is a detail rear view of a portion of the lazy-tongs upside down.

The instruments are composed of a number of flat metallic bars united by rivets and clamping-screws. At some points the joint is a rigid one, and at others the rivet serves as a hinge to permit a pivotal action. Some of the bars are made in two parts, one superimposed upon the other and each one slotted. The rivets in this case are fixed in one part and slide in the slot in the other part, so that these two-part bars are adjustable in length. In place of a rivet I use when necessary a screw-stud and clamping-nut to fasten the parts when adjusted. The under part of these extensible bars, as shown in the drawings, is provided with graduations numbered to designate inches and fractions thereof. The upper part is stamped with a word indicating the particular measure which it represents. The sliding rivets are lettered $x$, the clamping-nuts $y$, and the pivoted or hinged rivets $z$.

The mode of using the instruments is to take the proper measurements with a tape-measure and then set the several bars of the instrument to agree with those measurements. The instrument is then laid upon a sheet of paper if a pattern is to be made, or upon the fabric itself, if desired, and the edges of the bars are used as rulers by which to draw the necessary lines. The instrument thus constitutes an adjustable templet or drafting-form.

Fig. 1 shows an instrument for laying out the several pieces composing one-half of the waist of a woman's dress.

The bar A A' defines the central vertical line of the front, and the bar B B' the central line of the back. Fixed to the top of the bar A is a curved neck-bar made in two parts C C', which are adjustably united by the sliding rivet $x$ and clamping-nut $y$. These parts are clearly shown in Fig. 3, the nut $y$ working on a threaded stud $y'$, fixed in the under one of the two bars and having a head $y^2$ to prevent the nut from coming off and getting lost. There is sufficient space between the top of the nut and the head $y^2$ to allow the nut to be loosened when the bars are to be adjusted.

Pivoted to the upper end of the bar C' by a rivet $z$ is a two-part adjustable shoulder-bar D' D, the former being graduated. The back of the neck is defined by a curved bar $C^2$, slotted and clamped by a nut $y$ to the top of the back bar B. Another extensible shoulder-bar $D^2 D^3$ is riveted to the upper end of the neck-bar $C^2$.

Pivoted to the end of the shoulder-bar D is a curved bar E, forming one of a series of bars E E' $E^2$ $E^3$ $E^4$ $E^5$, which outline the armhole, the bar $E^5$ being pivoted to the end of the shoulder-bar $D^2$. The bars E E' are adjustably united, and so, also, are the bars $E^2$ $E^3$ and $E^4$ $E^5$. The bar $E^2$ is pivoted to E', and $E^3$ is pivoted to $E^4$. The front width is laid off on an extensible bar F F', rigidly riveted to the bar A and pivoted on the rivet $z$, which unites the bars E' $E^2$. The back width is defined by the extensible bars G G', riveted firmly to the back bar B and also to the lower end of the bar $E^5$. The side length is set off on an extensible bar H H', riveted firmly to the bar $E^2$ and pivoted to the meeting ends of two extensible bars I I' $I^2$ K K', which provide for the waistband measure. To the middle of the part I is pivoted one end of an extensible bar L L', the upper end of which is pivoted to a short bracket $E^6$, lying behind the bar $E^3$ and rigidly fastened to the upper end thereof. To the middle of the part I² is pivoted the lower end of an extensible bar M M', the upper end of which is pivoted to the back-width bar G near the latter's point of connection with the bar E⁵. The outer end of the part I² is adjustably connected with the back bar B'. To the middle of the part I is also rigidly riveted an inverted-V-shaped hip-dart piece N, the inner lines of which are extended where they meet by notches $n$. A similar piece N', having notches $n'$, is rigidly riveted to the middle of the part I².

Pivoted to the lower end of the side-length bar H are two links $o\ o'$. The former is pivoted at its lower end to an extensible bar P P', the other end of which is pivoted to the bottom of the back bar B'. The link O' is similarly connected with the front bar A' by an extensible bar Q Q', pivoted to the link O' and to the bar A'. The bars P P' Q Q' are for laying off the hip measure. To outline the darts, I provide two pairs of lazy-tongs. One pair (the larger) is composed of two bars R R', pivoted together at their middle by a pivot $x'$, which slides in a slot $k$ in the bar K. The upper portion of each bar R R' is made in two parts, so as to be extensible, and the upper end of each is pivoted by a rivet $r$ to a link $r'\ r^2$. The rivets $r\ r$ slide in slightly-curved slots $t$, formed in the part T of the extensible bar T T'.

To the lower end of each bar R R' is pivoted a link $r^3\ r^4$. The upper ends of these links are pivoted to the lower ends of the links $r'\ r^2$, respectively.

The smaller lazy-tongs are composed of two bars S S', pivoted at their middle points upon the rivet $x'$, which also unites the bars R R'. To the ends of the bar S are pivoted links $s\ s'$, and to the ends of the bar S' the links $s^2\ s^3$. The links $s'\ s^3$ are pivotally united together and to the link $r^2$ at or near its connection with the link $r^4$. At this point the links are not attached to the bars K K', but are free to move. The links $s\ s^2$ are pivotally connected with each other, with the link $r'$, and with the bar K by a rivet $k'$, which fixes this point in both lazy-tongs with reference to the front bar A. By this construction the darts will always be of equal width, while the sliding pivot $x'$ and the freedom of the inner ends of the lazy-tongs permit the width of the darts to be changed. The inner end of the bar T T' is pivoted on the same rivet as the front-width bar F F', while its outer end has a stud $t'$, which slides in the vertical slot $a'$, formed in a widened portion $a$ of the front bar A'. This construction permits the height of the darts to be varied, as well as also the space between their upper ends. In laying off the waistband measure allowance must be made for the width of the darts.

Fig. 2 shows a form for drafting a sleeve. Near the upper and lower ends of an extensible bar U U' are rigidly riveted cross-bars V W, both arms of each being slotted and provided with a sliding extension V' V² W' W². Riveted to the left-hand end of the bar V is a curved bar X, which is also riveted to the upper end of the bar U'. The end of the bar X is slotted and connected with two extensible parts X' X², the latter being pivoted to the end of the part V². At the same point is pivoted the extensible bar Y Y', the lower end of which is pivoted to the end of the part W². Similarly the ends of the parts V' W' are pivoted to on extensible bar Z Z'.

Rigidly fastened to the end of the part W' is an extensible bar $b\ b'$, to the lower end of which is riveted at right angles an extensible bar $c\ c'$, the end of which is pivoted to an extensible link $d\ d'$, which is in turn pivoted to the lower end of the bar U. At the same point is pivoted an extensible link $e\ e'$, the lower end of which is pivoted to an extensible bar $f\ f'$, which is rigidly fastened at right angles to an extensible bar $g\ g'$, the latter being rigidly fastened to the end of the part W². In using this instrument the ends of the cross-arm V are adjusted to register with a number on the scales of the parts V' V² corresponding with the arm measure. The end of the part X' is similarly adjusted on the scale of the part X. The ends of the cross-arm W are set at the elbow measure on the parts W' W². The extensible bars Y Z are set at the length from armhole to elbow. Bars $b\ g$ are set at the length from elbow to hand. Bars $c\ f$ are set at the hand measure, all as numbered on the scales, which are suitably arranged to give the proper size to the cloth when thus set. The mode of using these instruments to outline the several pieces of a garment will be readily understood by those who are skilled in the art of dressmaking. It may be briefly explained, however, that the "front" is outlined by the bars A A' C C' D D' E E' H H' O' Q Q' and the darts by the lazy-tongs R S. The "under-arm piece" is marked out by the bars E² E³ H H' L L' O P and the right-hand branch of the hip-dart piece N. The "side form" is defined by the bars E³ E⁴ E⁵ L L' M M', the left branch of the piece N, and the right branch of the piece N'. The "back form" is outlined by the bars B B' C² D² D³ E⁴ E⁵ M M' and by the left branch of the piece N'. It is thus apparent that all the pieces of the waist can be drafted from one setting of this single instrument.

Having thus described my invention, what I claim, and desire to secure by Letters Patent, is—

1. In a drafting-form for garments, lazy-tongs for outlining the darts, consisting of straight bars pivoted together at their middle and having a link pivoted to each end, the links nearer the front bar of the drafting-form being pivoted together and to the waist-bar and the other links being pivoted together, but free to move away from the front bar, substantially as described.

2. In a drafting-form for garments, a pair of connected lazy-tongs for outlining the darts, consisting of four straight bars pivoted together at their middle by a rivet sliding in a slot in the waist-bar and links pivoted to the ends of the bars, the four links nearer the front being pivotally connected with the waist-bar at a fixed point, the other four links being pivotally connected together, but free to move, substantially as described.

3. In a drafting-form, the combination, with suitable bars for outlining the back, side form, and under-arm pieces, of two inverted-V-shaped hip-dart bars N N', each having a V-shaped slot, as $n\ n'$, substantially as described.

In testimony whereof I affix my signature in presence of two witnesses.

JOSEPH H. CHOQUETTE.

Witnesses:
 ARBA N. LINCOLN,
 ALFRED H. HOOD.